(12) United States Patent
Uttrachi

(10) Patent No.: US 7,019,248 B1
(45) Date of Patent: *Mar. 28, 2006

(54) WELDING SHIELDING GAS FLOW-CONTROL DEVICE

(76) Inventor: Gerald Daniel Uttrachi, 4313 Byrnes Blvd., Florence, SC (US) 29506-8310

( * ) Notice: Subject to any disclaimer, the term of this patent is extended or adjusted under 35 U.S.C. 154(b) by 0 days.

This patent is subject to a terminal disclaimer.

(21) Appl. No.: 11/063,472

(22) Filed: Feb. 22, 2005

(51) Int. Cl.
*B23K 35/38* (2006.01)
(52) U.S. Cl. .......................... 219/74; 219/75
(58) Field of Classification Search .............. 219/74, 219/75; 228/219
See application file for complete search history.

(56) References Cited

U.S. PATENT DOCUMENTS

| | | | |
|---|---|---|---|
| 3,275,796 A | | 9/1966 | Bernard et al. |
| 3,811,027 A | * | 5/1974 | Strahan ..................... 219/74 |
| 4,278,864 A | * | 7/1981 | De Facci et al. ............. 219/75 |
| 4,341,237 A | | 7/1982 | Stauffer |
| 5,304,776 A | * | 4/1994 | Buerkel et al. ........ 219/125.11 |
| 6,610,957 B1 | | 8/2003 | Uttrachi |

OTHER PUBLICATIONS

U.S. Appl. No. 10/972,866, filed Oct. 22, 2004, Uttrachi.
Weber; How to save 20% on weld costs; Trailer Body Builders; Jan. 2003; pp. 46 to 50; (pp. 46 relevant); vol. 44, # 3; Primedia, NY, NY.
Standifer; Shielding Gas Consumtion Efficiency; The Fabricator; Jun. 2000; pp 26 to 29; vol. 30, # 6; Croydon Group, Rockford, IL.

* cited by examiner

*Primary Examiner*—Jonathan Johnson
*Assistant Examiner*—Rachel E. Beveridge

(57) ABSTRACT

These shielding gas flow-control devices avoid weld start quality problems often created in typical GMAW systems. They accomplished this while maintaining the common high pressure gas delivery pressures. Higher pressures maintain automatic flow compensation when gas restrictions occur while welding. A measured amount of extra shielding gas is quickly delivered at the weld start to displace air that enters the welding torch body and cable when welding is stopped. They also provide extra gas to purge the air in the weld start area. The extra gas is provided without excess gas flow velocity that, if present, causes air to be pulled into the shielding gas stream. These unique devices control gas flow while being located in, on or in close proximity to the wire feeder. A simple method of limiting gas flow adjustment is also included. These systems also minimize shielding gas waste which often occurs at the weld start.

20 Claims, 6 Drawing Sheets

WELDING SHIELDING GAS FLOW-CONTROL DEVICE

BACKGROUND

Field of Invention

This invention relates to improving gas metal arc welding start quality and in some instances reducing shielding gas waste.

Background

Gas metal arc welding (GMAW) is the official American Welding Society designation for one of the most common welding processes. It is often called MIG welding or "wire welding." The official designation of GMAW will be used in the text of this document. In the GMAW process molten metal is produced by an electric arc. A welding wire is fed into the arc zone by a feeding mechanism. A suitable power source is connected between the workpiece to be welded and to the welding wire passing though a welding torch. Welding power, welding wire, and shielding gas are usually transported through the welding torch. The welding is usually attached to a flexible cable assemble and is manipulated by the welding operator. Molten metal comprising the weld is derived from the materials to be welded and the welding wire. The molten weld metal is protected from the surrounding air by a shielding gas. The welding wire is melted into droplets most of which are transported to the weld puddle and solidify into the weld. However about 2% to 4% of the droplets are expelled from the weld zone and are referred to as weld spatter.

The shielding gas employed to protect the molten metal formed by the electric arc can be a number of gases such as argon, carbon dioxide, and helium. Mixtures of these and small amounts of other gases are employed to provide the desired welding performance. Shielding gas is supplied from a pipeline or a high-pressure cylinder. When high pressure cylinders are employed for the gas supply a regulator is used that may have a preset output of 172 kPa, kilopascals (25 psi, pounds per square inch), 207 kPa (30 psi), or in some common regulators 345 kPa (50 psi). For GMAW systems using carbon dioxide as a shielding gas supplied in cylinders, it is common to employ a regulator with 550 kPa (80 psi) output. This higher outlet pressure reduces the possible formation of ice crystals in the regulator/flow-control system as the carbon dioxide gas pressure is reduced from that in the cylinder. When shielding gas is supplied in a pipeline in a fabricating shop it is most common to have the pressure in the pipeline be 345 kPa (50 psi) or higher.

It is most common to have the gas flow-control device located at the gas supply either at a gas pipeline in combination with a regulator at a high pressure gas cylinder. Gas is then usually delivered to each welding machine though a flexible shielding gas delivery hose. However this arrangement causes excess gas to be stored in the gas delivery hose when welding is stopped. This stored excess gas is then released in a short time when welding is again started. The details of how this occurs consist of the flowing processes; while welding, the gas solenoid is open, and the pressure in the gas delivery hose is only that needed to establish and maintain the desired flow. The flow-control device located at the gas source is set for the desired shielding gas flow rate and indirectly establishes this pressure. When welding commences the pressure in the gas delivery hose near the gas solenoid is typically less than 35 to 55 kPa (5 to 8 psi). When welding is stopped the gas solenoid closes and flow of shielding gas from the gas solenoid to the welding torch stops. However, the gas flow continues to flow though typical flow-control devices employed and fills the gas delivery hose until the gas pressure in the hose reaches the pressure in the pipeline or that pressure set by the regulator, if present. The pressure in the gas delivery hose than rises from what was needed to establish the proper flow level to the outlet pressure in the pipeline or that set by the regulator. The excess pressure stores shielding gas in the gas delivery hose connecting the flow-control device to the welding machine or wire feeder until the gas solenoid is opened at the start of the next weld. When welding is restarted, this excess shielding gas is expelled very rapidly, often within less than about 1 to 3 seconds.

Depending on the number of starts and stops versus the overall welding time, wasted shielding gas can exceed 50% or more of the total gas usage. An article in the June 2000 Fabricator Magazine entitled "Shielding Gas Consumption Efficiency," page 27, col. 2 & 3 sites the fact that most shops are using from about two to over ten times more gas than is necessary. In the same article, a significant waste is described (page 29, col. 3 & 4) as attributable to the storage of excess shielding gas in a commonly employed 6.4 mm (¼ inch) inside diameter shielding gas delivery hose. An article was also published in the January 2003 issue of Trailer Body Builders Magazine entitled "How to Save 20% on Welding Costs." On page 46 col. 3 of this article a representative from a leading manufacturer of shielding gases is quoted as saying, "A minimum of 142 Liters, L (5 cubic feet) of gas is required to weld 0.45 kg (1 pound) of wire, but the industry average usage is 850 L (30 cubic feet)." Since it is very unusual to need more than 225 to 280 L (8 to 10 cubic feet) of shielding gas per 0.45 kg (1 pound) of wire this statement means the average user consumes from three to six times the amount of shielding gas theoretically needed. Using the lower 3 times usage value and estimating the average retail price and annual volume; American consumers are wasting over 500 million dollars annually in shielding gas employed for GMAW.

In a small percentage of GMAW wire feed systems in use and offered for sale, a variable flow-control device is located at or near the wire feeder. This flow-control device allows adjustment of the shielding gas flow at the appropriate rate needed for welding. A flow measurement gauge or rotameter is often incorporated as part of the flow-control system. When the flow-control device is placed at or near the wire feeder, there is little or no excess shielding gas stored in the small gas passage between the flow-control device and the gas solenoid. However, some extra shielding gas is beneficial at the weld start to improve weld start quality. The extra shielding gas is needed to displace the air that enters when welding is stopped into the welding torch gas passages and welding torch cable transporting the shielding gas. If some extra shielding gas is quickly available at the weld start, it will also quickly displace air in the weld start area. However as occurs with more typical GMAW gas delivery systems having their gas flow-control at the gas source, significant excess shielding gas surge at the weld start is mostly wasted. In addition, it has been found that excess shielding gas flow creates turbulence in the shielding gas stream. This turbulence allows air to be pulled into the shielding gas stream allowing oxygen and nitrogen to interfere with arc stabilization and may cause internal weld porosity. Very high shielding gas surge-flow rates can momentarily be reached at the weld start, in excess of 95 L/min (200 CFH). This flow rate is much higher than desirable for good weld start quality. Weld start quality is degraded because excess shielding gas flow rate creates air to be pulled into the shielding gas stream.

Description of Prior Art

There have been devices which address the issue of supplying extra gas at the weld start and waste caused by the starting gas surge:

(a) Bernard, in U.S. Pat. No. 3,275,796 (1966) col. 5, 46 to col. 5, 49 states; "The system described provides a purging of the weld area where the arc is to be established by a strong blast of shielding gas to remove rust, dirt, and slag particles before the arc is established."

In tests, it was found that the excess shielding gas flow rate at the start is inconsequential in performing the cleaning tasks defined by Bernard. Excess flow rates and the resulting turbulence pull air into the shielding gas stream exiting the shielding gas nozzle. This air in the gas stream may create internal weld start porosity and excess weld spatter. High gas flow rates require a short time to stabilize into laminar flow even after the flow rates are reduced to more normal rates. Therefore allowing this high gas flow surge at the weld start causes weld quality problems.

(b) One device designed to reduce shielding gas loss at the weld start is described by Stauffer in U.S. Pat. No. 4,341,237 (1982). This device is of complex construction involving a number of mechanical elements and a surge tank to store and control this excess shielding gas. The numerous internal connections create the potential for gas leaks. The device incorporates a low pressure regulator to reduce gas waste and the surge storage tank is placed after the low pressure regulator. The surge tank designed to provide additional shielding gas at the weld start is large in size. Gas storage and extra gas supply at the weld start can only exist if the gas pressure in the storage device is higher than that needed while welding. The extra gas available for the weld start deliverable from this storage device must therefore rely on a regulator pressure which is higher than that needed to supply the desired flow of shielding gas while welding. If the device is to be effective in reducing shielding gas waste the pressure set by the regulator must be substantially lower than that in the incoming gas delivery line as is stated in the patent. In the Abstract of the referenced patent, Stauffer states; "At the station is a pressure regulator for substantially reducing the gas pressure and having an inlet in communication with the higher pressure gas supply and an outlet in communication with the inlet of a surge tank." Stauffer also states in col. 3, 49 to col. 3, 54; "The pressure regulator 104 delivers outlet pressure of between 0 to 15 psi (0 to 1.05 kg/cm$^2$) with inlet pressure of less than 350 psi (0 to 24.5 kg/cm$^2$), and maintains said low pressure consistently over the period of time consistent with welding requirements."

Thus, the surge tank in the device described by Stauffer must be large since the extra gas available is proportional to the pressure ratio in the surge tank. The pressure ratio is determined by using absolute pressure between that set at the regulator and that pressure needed to create the desired gas flow while welding. The practical implementation of a device labeled as being built under this patent contains a storage device which is large. It would not be practical or physically possible to integrate this device into the typical GMAW wire feeder design.

In addition, if the shielding gas pressure is set excessively low, there is little extra pressure available to compensate for restrictions which occur in the welding torch cable due to twisting and bending while welding. There is also little extra pressure to compensate and maintain the preset flow when weld spatter accumulates in the shielding gas nozzle and/or blocks the welding torch gas passages at the shielding gas nozzle end. Measurements made with a device designated as being covered by this patent showed preset gas flow reduced about 20% when simulating spatter blockage in the welding torch. In addition measurements made with another device employing this type of low pressure regulator design but without a gas storage device showed a similar reduction in flow with simulated weld spatter blockage. Higher pressure is needed to employ the principle of gas flowing though a critical-flow orifice reaching a limiting velocity based on the orifice size and the pressure upstream of the orifice. The pressure downstream of the orifice will have little or no influence on the flow rate as long as that pressure is less than about one half of the upstream pressure. All pressures being measured as absolute not gauge pressure. A gas delivery system designed to utilize higher pressure may be referred to as a self compensating system. The pressure needed to flow shielding gas through a gas solenoid, plumbing from the gas solenoid to a welding torch, through a welding torch cable (which can be 8 meters in length), welding torch gas passages, and shielding gas nozzle is dependent on the specific system. It is common for this pressure to be approximately 34 kPa (5 psi) gauge pressure. The absolute pressure would then be about 134 kPa (20 psi). To control flow and provide automatic self compensation for that flow under varying restrictions that occur while welding, the absolute pressure upstream of the critical-flow orifice or variable flow-control device would need to be approximately twice that pressure level or the absolute pressure would be about 268 kPa (39 psi). Measured at gauge pressure that would be about 168 kPa (24 psi). Therefore the gauge pressure needed to assure flow compensation must be above about 140 kPa (20 psi). This is significantly higher pressure than the maximum outlined by Stauffer which as stated was a maximum of 103 kPa (15 psi).

Some low pressure devices have been used to reduce gas waste. Some of these devices are designed to be located at or near the wire feeder. However some of these devices provide little or no extra shielding gas at the weld start. This can cause porosity at the weld start due to these devices not quickly providing the extra shielding gas needed to displace the air that enters the shielding gas nozzle, welding torch body, and welding torch cable when welding is stopped. Also the lack of extra gas pressure at the gas solenoid does not provide compensation for restrictions that occur in the welding torch body due to spatter build-up causing variations in shielding gas flow while welding. As noted with the device described in the Stauffer patent, these low pressure devices typically operate below 103 kPa (15 psi) and do not provide automatic flow compensation for restrictions that occur while welding.

(c) Another method designed to: a) produce a controlled amount of extra gas at the weld start, b) prevent excessive gas surge at the weld start to minimize air being pulled into the shielding gas stream, and c) maintain higher system pressure to provide automatic flow compensations when restrictions occur is outlined in patent application Ser. No. 10/972,866 filed Oct. 22, 2004 by Uttrachi. This device utilizes a section of gas delivery hose to store a controlled amount of extra gas so it can be quickly delivered at the weld start. However, for some applications it is not desirable to have a flow-control located along the length of the gas delivery hose.

With the device described in that patent application it is also not practical to utilize a normal rotameter type flow gauge in close proximity to the GMAW wire feeder where it would be most convenient for the welding operator to view. That would require the rotameter to be installed in the gas delivery hose since it must be upstream of the flow-control. This is impractical in most production environments.

SUMMARY, OBJECTS AND ADVANTAGES

It is the object of this present invention to avoid the performance problems and gas waste created in typical GMAW systems when excess gas is stored in the gas delivery hose when welding is stopped. This objective is accomplished while maintaining the standard high pressure gas delivery systems to provide important benefits including maintaining automatic flow compensation when gas restrictions occur as well as assisting in quickly providing a controlled amount of extra shielding gas at the weld start. Utilizing unique flow-control devices located in, on or in close proximity to the wire feeder makes the gas contained in the gas delivery hose inconsequential to that gas delivered to the welding system. This eliminates the problems of gas waste from excess gas stored in the delivery hose and poor weld start performance due to excess gas flow at the weld start. These shielding gas flow control mechanisms provide a means of establishing the flow of shielding gas to a GMAW machine from a gas source such as a pipeline or a high-pressure cylinder. These systems also provide a controlled amount of extra gas at the weld start without excess gas flow velocity causing air to be pulled into in the shielding gas stream and while minimizing gas waste.

The principle device described in this invention may employ a simple needle valve or a variable orifice type device. One unique feature of this device provides for a controlled the amount of storage of shielding gas in a gas accumulator when welding is stopped. The volume of stored gas is established to displace air that enters the welding torch cable, welding torch body, and welding torch shielding gas nozzle when welding is stopped. The gas accumulator can be any external shape as long as the internal volume is within the limits needed. By employing pressures significantly higher than in low pressure devices, the physical volume of the gas accumulator can be significantly smaller. The volume of needed extra stored gas is proportional to the excess pressure over that required to flow shielding gas through the system while welding. This makes it feasible to locate the complete mechanism within or in a compact manner attached to the wire feeder. An additional advantage of having this higher pressure is that it will be the pressure of the stored gas in the gas accumulator when welding is stopped. It has been found that by having this higher pressure in the gas accumulator it quickly expels extra shielding gas at the weld start to displace air that enters the welding torch and welding torch cable as well as in air the weld start area. If the same volume of extra shielding gas were delivered from a larger storage area, but at a lower pressure, the time it takes to deliver the extra shielding gas is increased. If the time is excessive it will not be effective in controlling the transient start and when expelled it will just be wasted. To control the maximum gas surge velocity from the gas accumulator, a surge-flow restriction orifice may be employed. Assuring that the desired feature of automatic flow compensation is achieved and a minimal size gas accumulator is satisfactory, a minimum pressure should be maintained. Therefore, the pressure in the gas delivery hose connected to this flow-control device should be greater than about 170 kPa (25 psi). This gas flow-control device may incorporate a rotameter flow-measuring device, an electronic flow-measuring device or any suitable flow-measuring and display means.

Other designs are defined that employ a critical-flow orifice and a pressure regulator to accomplish the shielding gas flow-control objectives. These have several basic forms, one where the pressure regulator is located in, on or in close proximity to the wire feeder, another where just the critical-flow orifice is mounted at the wire feeder and the pressure regulator is located at the gas source, be it cylinder or pipeline, and a third that utilizes two critical orifice flow controls. To assure the feature of automatic flow compensation is achieved and to allow for the needed variation of pressure to control the gas flow, the pressure at the gas source should be approximately 350 kPa (50 psi) or higher. This allows the pressure at the output of the regulator to reduce to a minimum of approximately 170 kPa (25 pounds per square inch) while still providing the desired flow. The devices described in this invention that employ a pressure regulator and critical-flow orifice to control flow may incorporate a mechanical or electronic pressure measuring device calibrated to read the flow through the critical-flow orifice or may include any suitable means of measuring and displaying flow.

One unique design helps satisfy the desire to limit the welder from having complete control on the shielding gas flow. If the flow control is locked from the welder they will not be able to adjust for conditions such as changing joint design or when a breeze is present in the shop. This will either cause weld problems but most often it is found the gas flow is set for the worse condition encountered in the shop. Therefore gas waste occurs when the higher flow is not needed. Employing two critical-flow orifices, one with a flow valve, allows a range of shielding gas control available for the welder to select. It is also possible to remotely active the control to one of the orifices and centrally control a large number of welding machines in a shop.

Further Objects and Advantages will become apparent from the drawings and ensuing description.

DRAWING FIGURES

FIG. 1 schematically represents a typical GMAW system that employs a variable flow-control and flow-measuring device mounted at a wire feeder.

FIG. 2 schematically represents a typical GMAW system that employs a variable flow-control and flow-measuring device including a gas accumulator mounted at a wire feeder.

DESCRIPTION

Main Embodiment

Figure 1:
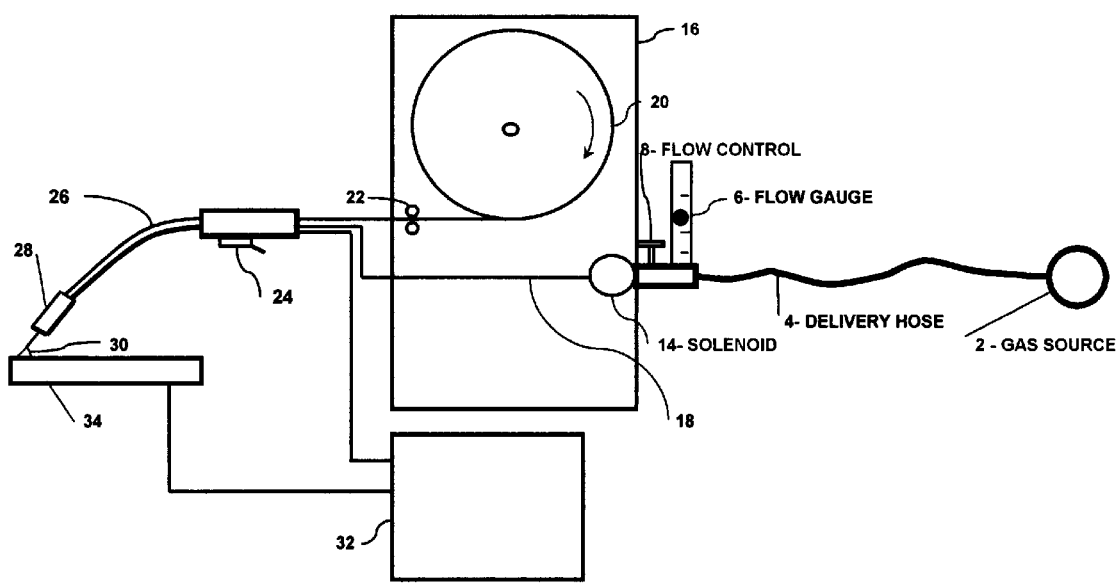

FIG. 1 illustrates a GMAW system with flow-control 8 device and a rotameter flow gauge 6 mounted at the wire feeder 16. Shielding gas source 2 may be a gas pipeline or a high pressure cylinder (not shown). If the gas source 2 is a high pressure cylinder (not shown) a regulator (not shown) would be employed to lower the pressure usually to less than about 700 kPa (101 psi). A gas delivery hose 4 transports gas from the gas source 2 to the flow-control 8. A rotameter flow gauge 6 may be incorporated with the flow-control 8 device. In systems using a flow-control 8 device located at the wire feeder it is common to connect it directly or with a minimum connecting volume passage directly to an electrically operated gas solenoid 14 that controls the gas flow off and on. This gas solenoid 14 is incorporated in or near the welding wire feed system 16. A welding torch switch 24 is usually employed to activate the gas solenoid 14, the wire feed mechanism 22, and the power source 32. This wire feed system 16 usually contains a wire spool 20. The shielding gas is delivered from the gas solenoid 14 through a gas passage 18 to the welding torch 26. The welding torch 26 has affixed to the end a shielding gas nozzle 28 that directs the shielding gas stream to protect the weld area from the surrounding air. The welding power source 32 may be integral with the wire feed system 16 or separate. The welding power and welding wire are also transported to the welding torch 26. The shielding gas, welding wire, and welding power form an arc 30 at the workpiece 34.

Figure 2:
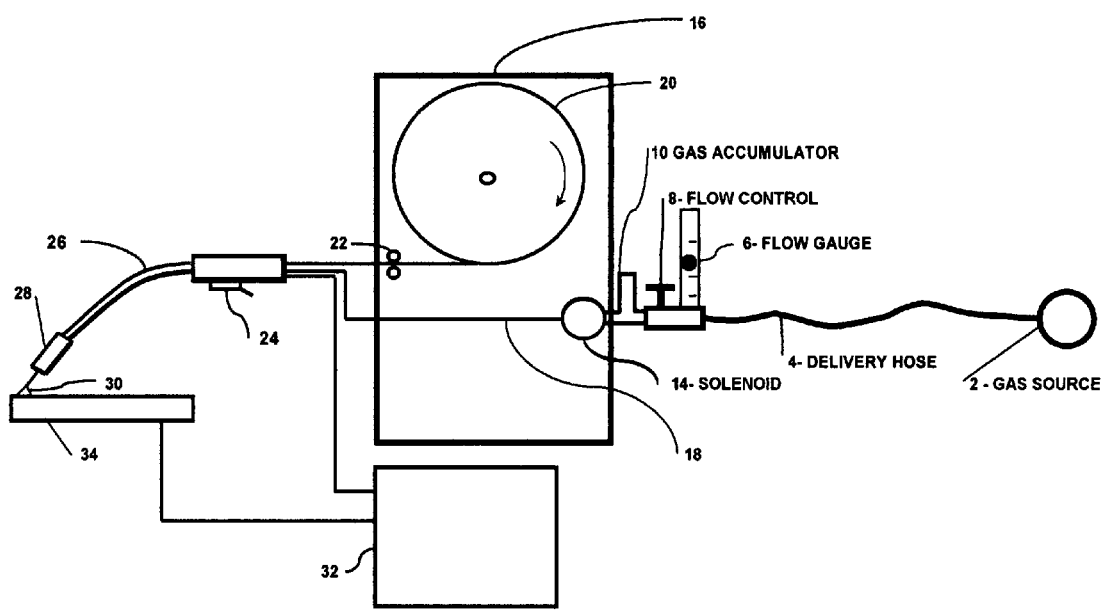

FIG. 2 is a schematic illustration of the principle embodiment of this invention. It has an additional element to those described in FIG. 1 of a gas accumulator 10. The gas accumulator 10 is a storage device to provide extra gas for the weld start. The gas accumulator 10 can take any external shape while maintaining the desired internal volume.

Figure 3:
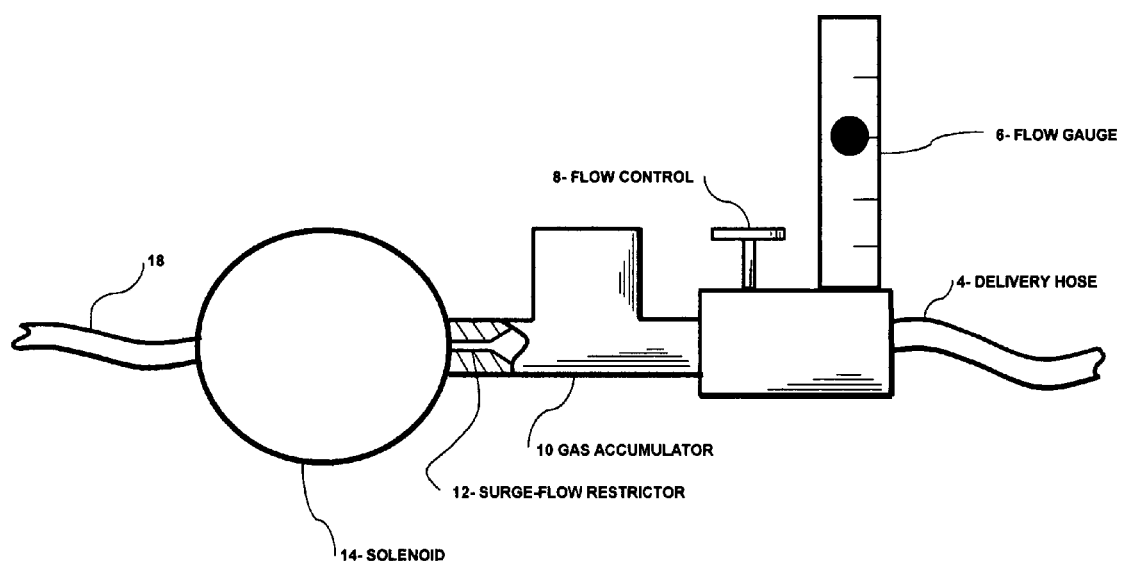
FIG. 3 is a schematic of the main elements showing the details of the gas accumulator and a flow-surge restrictor with flow gauge.

FIG. 3 is a closer view of the gas accumulator 10 also showing a surge-flow restrictor 12 located between the gas accumulator 10 and the gas solenoid 14. The surge-flow restrictor 12 limits the maximum gas flow rate at the weld start.

Operation

Main Embodiment

Referring to FIG. 1. When welding is initiated, usually by closing the welding torch switch 28, the gas solenoid 14 is opened. Shielding gas flows from a gas source 2, through a gas delivery hose 4, though a flow-measuring device 6, if present, to a flow-control 8 device. The flow-control 8 device is adjusted to provide the desired shielding gas flow. Gas flow continues through open gas solenoid 14, through gas passage 18 to welding torch 26 and shielding gas nozzle 28. The gas pressure at the exit of flow-control 8 is established by the restriction created by the flow-control 8 device. The shielding gas, welding wire 20, and welding power 32 come together to form an arc 30 at the workpiece 34. The welding wire is melted into droplets in the arc most of which form the weld. However from 2% to 4% of the droplets are expelled from the weld area and are referred to as weld spatter.

FIG. 2 is a schematic illustration of the principle embodiment of this invention. It operates in a similar manner as that described for FIG. 1 except there is an addition of a gas accumulator 10. While welding, the pressure at end of the flow-control 8 closest to the gas accumulator 10 is only that needed to flow the desired amount of shielding gas. If, for example, a needle valve control is employed as the flow-control 8 device then the pressure in the gas delivery hose 4 will be reduced by the needle valve to only that needed to produce the required flow. When welding is stopped, gas will continue to flow through the needle valve until the pressure in the gas accumulator 10 essentially equals that in the gas delivery hose 4. The gas pressure in the gas accumulator 10 above that needed to flow shielding gas when welding causes excess gas to be stored in the gas accumulator 10. The amount stored is proportional to the ratio of the absolute pressure differences. This excess stored as in the gas accumulator 10 will be expelled at the weld start when the gas solenoid 14 is opened.

FIG. 3 is a closer view of the gas accumulator 10 also showing a surge-flow restrictor 12 located after the gas accumulator 10 and before the gas solenoid 14. The surge-flow restrictor 12 is sized to limit the maximum flow of surge gas at the weld start, but is does not control the steady state flow of shielding gas when welding. The steady state flow rate is controlled by the flow-control 8.

Description and Operation

Additional Embodiments

Figure 4:
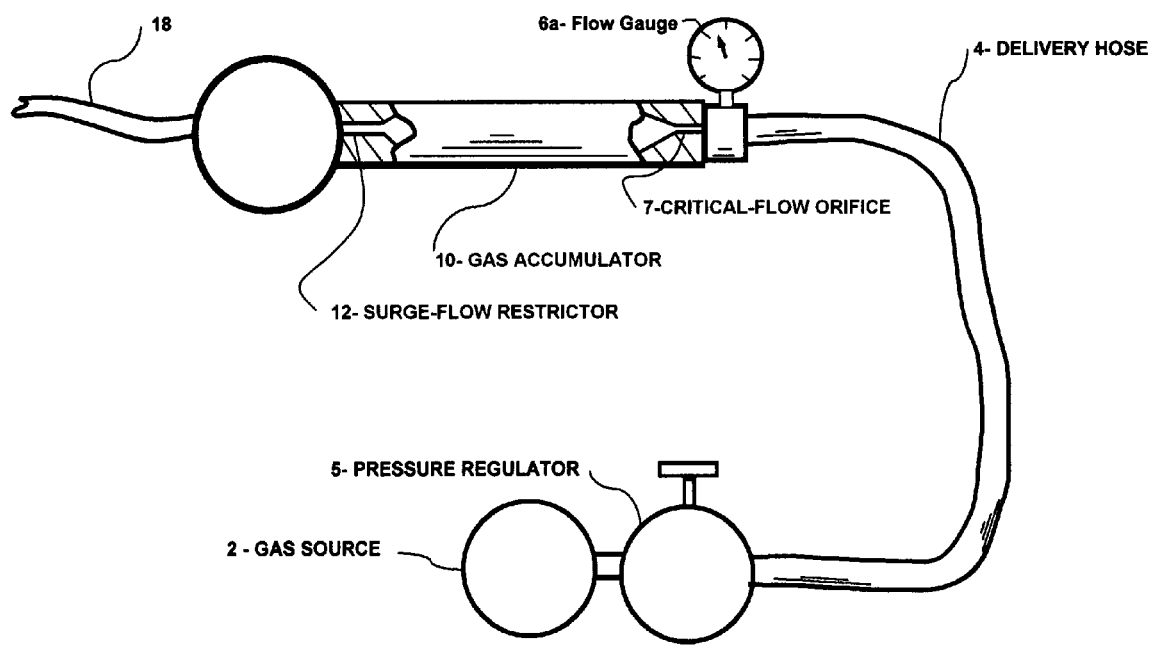
FIG. 4 is a schematic of the elements of one variant with pressure regulator mounted at the gas source and details of the gas accumulator, critical-flow orifice, flow-surge restrictor, and flow gauge.

Referring to FIG. 4, an alternate method of controlling shielding gas flow is to use a critical-flow orifice 7 on the inlet side of the gas accumulator 10. By controlling the pressure in the gas delivery hose 4 with a regulator 5 at the gas source 2 the volume of gas flow in the system while welding can be adjusted to the desired level. Gas accumulator 10 performs the function of storing gas when welding is stopped at the minimum pressure set by pressure regulator 5. When welding, the pressure in gas accumulator 10 will be only that established by a combination of the critical-flow orifice 7 and the pressure at the end of the gas delivery hose 4 that is closest to the gas accumulator 10. The gas accumulator 10 will deliver extra stored shielding gas when welding is started. The end of the gas accumulator 10 closest to the gas passage 18 may incorporate a surge-flow restricting device 12 to limit the shielding gas flow rate being expelled at the weld start. The system may incorporate a flow gauge 6a or some type of pressure sensing device which may be calibrated to read the flow through the critical-flow orifice 7. It is possible to select a critical-flow orifice size to provide the range of shielding gas flows typically used in GMAW. It is important to achieve the desired flow while maintaining the desired minimum pressure. To maintain the benefits of higher pressure the minimum gas pressure should be about 160 kPa (23 psi). The critical-flow orifice size must also provide sufficient flow rate at the typical pipeline pressure of about 340 kPa (50 psi). This can be achieved with a properly designed critical-flow orifice of about 0.8 millimeters (0.032 inches) in diameter. This provides shielding gas flow range of about 12 liters/min (25 cubic feet/hr) to about 22 liters/min (46 cubic feet/hr). These flow rates provide an acceptable range for most GMAW.

Figure 5:
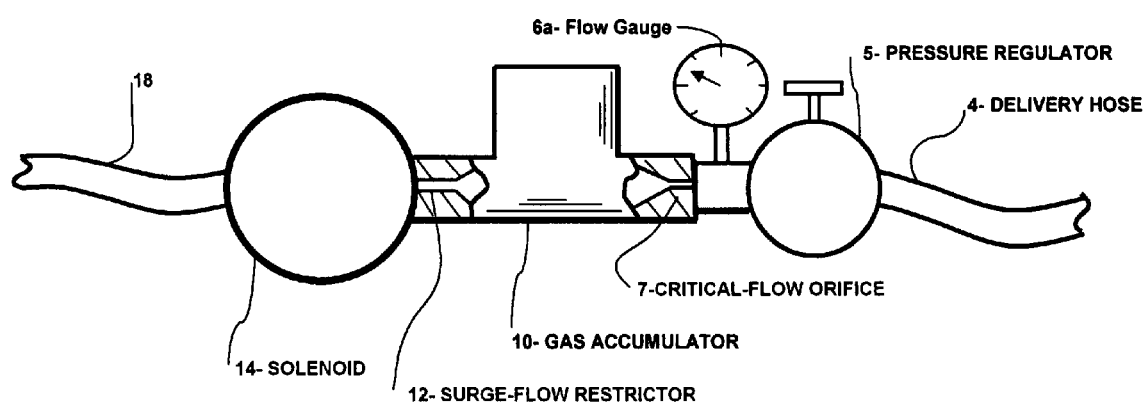
FIG. 5 is a schematic of the elements of one variant with pressure regulator mounted in proximity of the gas solenoid showing the details of the gas accumulator, critical-flow orifice, flow-surge restrictor, and flow gauge.

Referring to FIG. 5, an alternate method of controlling shielding gas flow is to use a critical-flow orifice 7 on the inlet side of the gas accumulator 10 in combination with a pressure regulator 5. If the gas source 2 is a high pressure cylinder (not shown) a regulator (not shown) would be employed to lower the pressure usually to less than about 700 kPa (101 psi). By controlling the pressure upstream of the critical-flow orifice 7 the volume of gas flow in the system while welding can be adjusted to the desired level. Gas accumulator 10 performs the function of storing gas when welding is stopped at the minimum output pressure set by pressure regulator 5. To provide automatic compensation for gas flow when gas flow restrictions occur during the welding operation, the minimum output pressure of pressure regulator 5 should be approximately 160 kPa (23 psi). When welding the pressure in gas accumulator 10 will be only that established by a combination of the critical-flow orifice 7 and the pressure at the gas accumulator 10 end of the gas delivery hose 4. The gas accumulator 10 will deliver extra stored shielding gas when welding is started. The end of the gas accumulator 10 closest to the gas passage 18 end may incorporate a surge-flow restricting device 12 to limit the flow rate of shielding gas exiting at the weld start. The system may incorporate a flow gauge 6a or some type pressure sensing device which is calibrated to read the flow through the critical-flow orifice 7.

Figure 6:
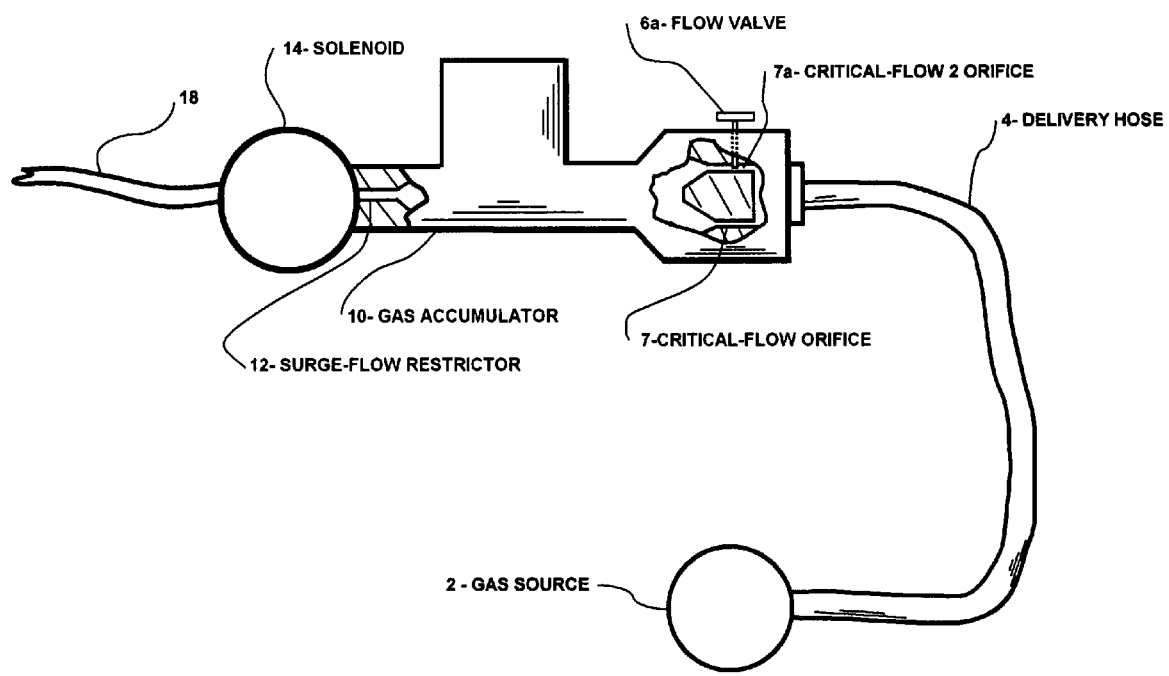
FIG. 6 is a schematic of the elements of one variant with two critical-flow orifices mounted in parallel in the intake port of the gas accumulator, one having a valve, also including a flow-surge restrictor.

Referring to FIG. 6, an alternate method of controlling shielding gas flow is employing bifurcated gas passages after the inlet port of the gas accumulator 10. Located in one of the two passages is a critical-flow orifice 7 and in the other gas passage critical-flow 2 orifice 7a. The gas passage containing critical-flow 2 orifice 7a also has a flow valve 6a located such that it can further restrict the flow of gas that passes through critical-flow 2 orifice 7a. The flow valve 6a can be adjusted to completely block or restrict the flow to critical-flow 2 orifice 7a if desired. With this arrangement the typically desired minimum gas flow rate is established with the predetermined size of critical-flow orifice 7 and the pressure in the gas delivery hose 4. The pressure in gas delivery hose 4 can be that of the gas source 2 if a pipeline supply is employed or if a high pressure cylinder (not shown) is utilized the pressure would be set by a regulator (not shown) mounted on the cylinder. The size of the critical-flow office 7 and the critical-flow 2 orifice 7a would be defined in combination with the pressure in the gas delivery hose 4. The flow valve 6a could be completely shut which would limit flow to that defined by critical-flow orifice 7. As the flow valve 6a is opened, ultimately completely opening the gas passage to critical-flow 2 orifice 7a, the flow rate will be established by the predetermined size of the critical-flow 2 orifice 7a in addition to the gas flow from the predetermined size of critical-flow orifice 7. In this way the welding operator has the ability to increase flow rates from a predetermined minimum to a predetermined maximum level. It is also possible to have flow valve 6a remotely operated. Gas accumulator 10 performs the function of storing gas when welding is stopped at the pressure in gas delivery hose 4. To provide automatic compensation for gas flow when gas flow restrictions occur during the welding operation, the minimum of pressure in gas delivery hose 4 should be approximately 160 kPa (23 psi). When welding, the pressure in gas accumulator 10 will be will be substantially lower than that in gas delivery hose 4. When welding, the pressure in the gas accumulator 10 is established by a combination of the pressure drops created in; a) the critical-flow orifice 7, b) the critical-flow 2 orifice 7a, and c) the flow valve 6a in combination with the pressure at the gas accumulator 10 end of the gas delivery hose 4. The gas accumulator 10 will deliver extra stored shielding gas when welding is started. The end of the gas accumulator 10 closest to the gas passage 18 end may incorporate a surge-flow restricting 12 to limit the flow rate of shielding gas exiting at the weld start. It is also understood although this embodiment utilizes dual gas passages that reside inside the input port side of the gas accumulator 10; it is also possible to employ two input ports to gas accumulator 10 or means to configure a similar arrangement of the gas flow components.

CONCLUSION, RAMIFICATION, AND SCOPE

The weld shielding gas control devices of this invention eliminate performance problems and gas waste created with typical GMAW gas delivery systems. This is accomplished while maintaining the normally used high pressure gas delivery systems. This higher pressure has several important benefits including maintaining automatic flow compensation when gas restrictions occur and quickly providing needed extra shielding gas at the weld start. These unique devices control gas flow while being located in, on or in close proximity to the wire feeder. These shielding gas control mechanisms described also provide a measured amount of extra gas at the weld start to displace air that enters the welding torch body and welding torch cable when welding is stopped. The controlled amount of extra shielding gas is expelled quickly to purge the air in the weld start area. The extra gas is provided without excess gas flow velocity that would cause air to be pulled into the shielding gas stream. These systems minimize shielding gas waste by providing only sufficient extra shielding gas needed at the weld start to produce quality welds.

One device described allows the welding operator to adjust shielding gas flow within predetermined minimum and maximum flow limits. This simple flow adjustment device could be easily operated remotely from a central location for shops with many welding machines. So, for example, when draft conditions exist the extra shielding gas needed could be controlled centrally for a number of welding machines including the possibility of using sensing of the shop condition. It could also be operated from the welding machine control to supply extra gas as the welding current were increased etc.

The above description contains many specificities to provide illustrations of some of the embodiments. However it is understood that other obvious items might be added such a locking mechanism to any of the variable flow-control devices described or a filter to prevent clogging of small orifices. Thus the scope of the invention should be determined by the appended claims and their legal equivalents, rather than the examples given.

I claim:

1. A shielding gas control device incorporated as an element in a gas metal arc welding system that comprises:
   a) a shielding gas source,
   b) a gas delivery hose,
   c) a variable flow-control device having an input and output port,
   d) a gas metal arc welding wire feeder,
   e) a gas accumulator,
   f) a gas solenoid or off-on gas control means having an input and output port,
   g) a welding torch, and
   h) a shielding gas nozzle; wherein:

i) if said shielding gas source is a high pressure cylinder the output pressure is regulated to less than about 700 kilopascals (101 pounds per square inch), and j) said shielding gas source is in fluid connection with said gas delivery hose whose internal gas pressure is controlled to be greater than about 160 kilopascals (23 pounds per square inch) so as to provide automatic flow compensation for flow restrictions that occur when welding, and k) said variable flow-control device is mounted in, on, or in close proximity to said gas metal arc welding wire feeder and the input port of said variable flow-control device is in fluid connection with the end of said shielding gas delivery hose closest to said gas metal arc welding wire feeder, and l) the output port of said variable flow-control device is in fluid connection with said gas accumulator; said gas accumulator having a predetermined internal volume to provide the desired amount of extra shielding gas at the weld start, and m) said gas accumulator is in fluid connection with the input port of said gas solenoid, and n) the output port of said gas solenoid is in fluid connection with said welding torch, and o) said welding torch is in fluid connection with said shielding gas nozzle;

whereas said variable flow-control device:
   i) regulates the rate of flow of shielding gas into said gas accumulator, and
   ii) is of a design such that, when welding is stopped and thereby said gas solenoid blocks the flow of the shielding gas, said variable flow-control device allows the gas pressure in said gas accumulator to essentially equalize with the higher gas pressure in said gas delivery hose that exists at that time.

2. The shielding gas regulating device of claim 1, wherein said gas accumulator has an internal volume between about 0.017 liters (1 cubic inch) to 0.084 liters (5 cubic inches) to provide extra shielding gas at the weld start.

3. The shielding gas regulating device of claim 1, further including at the input port of said gas solenoid a surge limiting flow-restricting orifice of a size such that it limits shielding gas flow rate to said welding torch at weld initiation but does not control steady state gas flow while welding.

4. The shielding gas regulating device of claim 3, wherein said surge limiting flow-restricting orifice is between about 1 mm (0.040 inches) and 1.5 mm (0.060 inches) in diameter.

5. The shielding gas regulating device of claim 1, further including a flow-measuring device, which can be a mechanical rotameter device, an electronic flow-measuring device or any suitable measuring means having continuous or momentary flow display means.

6. A shielding gas regulating device incorporated as an element in a gas metal arc welding system that comprises:
   a) a shielding gas source,
   b) a gas delivery hose,
   c) a variable pressure-control device having an input port and output port,
   d) a critical-flow orifice,
   e) a gas metal arc welding wire feeder,
   f) a gas accumulator having an input port and output port,
   g) a gas solenoid or off-on gas control means having an input port and output port,
   h) a welding torch,
   i) a shielding gas nozzle; wherein:

j) if said shielding gas source is a high pressure cylinder the output pressure is regulated to less than about 700 kilopascals (101 pounds per square inch), and k) said shielding gas source is in fluid connection with said gas delivery hose wherein the gas pressure in said gas delivery hose is greater than about 340 kilopascals (50 pounds per square inch) to provide automatic flow compensation for flow restrictions that occur when welding and allowing regulating gas flow through a pressure reduction, and l) said variable pressure-control device is mounted in, on or in close proximity to said gas metal arc welding wire feeder and the input port of said variable pressure-control device is in fluid connection with the end of said shielding gas delivery hose closest to said gas metal arc welding wire feeder and m) the output port of said variable pressure-control device is in fluid connection with the input port of said gas accumulator; said gas accumulator having a predetermined internal volume to provide the desired amount of extra shielding gas at the weld start, and n) gas being transported from the output port of said variable pressure-control to the input port of said gas accumulator passes through the said critical-flow orifice, and o) the output port of said gas accumulator is in fluid connection with the input port of said gas solenoid, and p) the output port of said gas solenoid is in fluid connection with said welding torch, and q) said welding torch is in fluid connection with said shielding gas nozzle, and whereas said variable pressure-control device:
   i) regulates the rate of flow of shielding gas through said critical-flow orifice while welding, and
   ii) establishes a minimum gas pressure at the output port of said variable pressure-control device above approximately 160 kilopascals (23 pounds per square inch) to assure automatic flow compensation for flow restrictions that occur when welding.

7. The shielding gas regulating device of claim 6, wherein said gas accumulator has an internal volume between approximately 0.017 liters (1 cubic inch) to 0.084 liters (5 cubic inches) to provide desired extra amount of shielding gas to said shielding gas nozzle at the weld start.

8. The shielding gas regulating device of claim 7, wherein said critical-flow orifice is sized to about 0.8 millimeters (0.032 inches) in diameter.

9. A shielding gas regulating device of claim 6, further including at the input port of said gas solenoid a surge limiting flow-restricting orifice of a size such that shielding gas flow rate to said welding torch at weld initiation is limited but that does not control steady state gas flow while welding.

10. The shielding gas regulating device of claim 9, wherein surge limiting flow-restricting orifice is between about 1 mm (0.040 inches) and 1.5 mm (0.060 inches) in diameter.

11. The shielding gas regulating device of claim 6, further including a flow-measuring device, which can be a mechanical or electronic pressure measuring device or any suitable flow-measuring and continuous or momentary flow display means calibrated to read the steady state gas flow rate while welding.

12. A shielding gas regulating device incorporated as an element in a gas metal arc welding system that comprises:

a) a shielding gas source,
b) a variable pressure-control device having an input port and output port,
c) a gas delivery hose,
d) a critical-flow orifice,
e) a gas metal arc welding wire feeder,
f) a gas accumulator having an input port and output port,
g) a gas solenoid or off-on gas control means having an input port and output port,
h) a welding torch,
i) a shielding gas nozzle; wherein:
j) said shielding gas source whose pressure is greater than about 340 kilopascals (50 pounds per square inch) to provide automatic flow compensation for flow restrictions that occur when welding, is in fluid connection to the input port of said variable pressure-control device, and
k) the output port of said variable pressure-control is in fluid connection with the said gas delivery hose, and
l) the end of said gas delivery hose closest to said gas metal arc welding wire feeder is in fluid connection with the input port of said gas accumulator; said gas accumulator having a predetermined internal volume to provide the desired amount of extra shielding gas at the weld start, and where gas accumulator is located in, on or in close proximity to said gas metal arc welding wire feeder, and
m) gas being transported from the end of said gas delivery hose closest to said gas metal arc wire feeder to the input port of said gas accumulator passes through said critical-flow orifice, and
n) the output port of said gas accumulator is in fluid connection with the input port of said gas solenoid, and
o) the output port of said gas solenoid is in fluid connection with said welding torch, and
p) said welding torch is in fluid connection with said shielding gas nozzle, and
whereas said variable pressure-control device:
  i) regulates the rate of flow of shielding gas through said critical-flow orifice into said welding torch while welding, and
  ii) establishes a minimum gas pressure in said gas delivery hose above approximately 160 kilopascals (23 pounds per square inch) to assure automatic flow compensation for flow restrictions that occur when welding.

13. The shielding gas regulating device of claim 12, wherein said gas accumulator has an internal volume between approximately 0.017 liters (1 cubic inch) to 0.084 liters (5 cubic inches) to provide extra shielding gas to said welding torch at the weld start.

14. The shielding gas regulating device of claim 13, wherein said critical-flow orifice is sized to about 0.8 millimeters (0.032 inches) in diameter.

15. A shielding gas regulating device of claim 12, further including at the output port of said gas accumulator a surge limiting flow-restricting orifice of a size such that shielding gas flow rate to said welding torch at weld initiation is limited but that does not control steady state gas flow while welding.

16. The shielding gas regulating device of claim 15, wherein surge limiting flow-restricting orifice is between about 1 mm (0.040 inches) and 1.5 mm (0.060 inches) in diameter.

17. The shielding gas regulating device of claim 12, further including a flow-measuring device, which can be a mechanical or electronic pressure measuring device calibrated to read the flow though the critical-flow orifice or any suitable flow-measuring means and continuous or momentary flow display means calibrated to read the steady state gas flow rate while welding.

18. A shielding gas regulating device incorporated as an element in a gas metal arc welding system that comprises:
a) a shielding gas source,
b) a gas delivery hose,
c) a critical-flow orifice,
d) a critical-flow 2 orifice,
e) a flow valve,
f) a gas metal arc welding wire feeder,
g) a gas accumulator having an input port and output port,
h) a gas solenoid or off-on gas control means having an input port and output port,
i) a welding torch,
j) a shielding gas nozzle; wherein:
k) if said shielding gas source is a high pressure cylinder the output pressure is regulated to less than about 700 kilopascals (101 pounds per square inch), and
l) said shielding gas source whose pressure is greater than about 160 kilopascals (23 pounds per square inch) to provide automatic flow compensation for flow restrictions that occur when welding is in fluid connection to said gas delivery hose, and
m) the end of said gas delivery hose closest to said gas metal arc welding wire feeder is in fluid connection with the input port of said gas accumulator, and
n) said gas accumulator having a predetermined internal volume to provide the desired amount of extra shielding gas at the weld start, and
o) said gas accumulator is located in, on or in close proximity to said gas metal arc welding wire feeder, and
p) where gas is transported from the end of said gas delivery hose closest to said gas metal arc wire feeder to the input port of said gas accumulator, and
q) the input port of said gas accumulator is bifurcated after it enters said gas accumulator and in one of the resulting gas passages is located said critical-flow orifice and in the other gas passage is located said critical-flow 2 orifice, and
r) where said gas passage in which is located said critical-flow 2 orifice also contains said flow valve which can limit the flow of gas through said critical-flow 2 orifice, and
s) the output port of said gas accumulator is in fluid connection with the input port of said gas solenoid, and
t) the output port of said gas solenoid is in fluid connection with said welding torch, and
u) said welding torch is in fluid connection with said shielding gas nozzle, and
whereas said flow valve:
  i) regulates the rate of flow of shielding gas through said critical-flow 2 orifice into said gas accumulator, and
  ii) can completely block the flow of gas to said critical-flow 2 orifice, and if so blocked then determines that the gas flow to said welding torch to be dependent on the predetermined size of said critical-flow orifice and gas pressure at the inlet port of said gas accumulator therefore defining the minimum flow of gas to said welding torch while welding, and
  iii) can be adjusted from a fully blocked condition to having no restriction to the flow to said critical-flow

2 orifice and if adjusted to be fully open allows said critical-flow 2 orifice having a predetermined size to flow an amount of shielding gas that in combination with the volume of gas passed through said critical-flow orifice determines the maximum amount of gas passing through said welding torch while welding, and iv) can be operated and controlled manually or automatically, and v) if operated automatically can be activated either from a remote location or from an appropriate control means built into the welding machine or located remotely.

19. The shielding gas regulating device of claim 18, wherein said gas accumulator has an internal volume between approximately 0.017 liters (1 cubic inch) to 0.084 liters (5 cubic inches) to provide extra shielding gas to said welding torch at the weld start.

20. The shielding gas regulating device of claim 18, further including at the output port of said gas accumulator a surge limiting flow-restricting orifice of a size such that shielding gas flow rate to said welding torch at weld initiation is limited but that does not control steady state gas flow while welding.

* * * * *